Dec. 22, 1953    M. H. GRAHAM    2,663,785
WAFFLE IRON
Filed Dec. 11, 1948    2 Sheets-Sheet 1

INVENTOR:-
MAURICE H. GRAHAM
BY William C. Babcock ATTORNEY

Dec. 22, 1953　　　　　M. H. GRAHAM　　　　　2,663,785
WAFFLE IRON

Filed Dec. 11, 1948　　　　　　　　　　　　　　　2 Sheets-Sheet 2

INVENTOR:-
MAURICE H. GRAHAM
BY William C. Babcock
ATTORNEY

Patented Dec. 22, 1953

2,663,785

UNITED STATES PATENT OFFICE 2,663,785

WAFFLE IRON

Maurice H. Graham, Minneapolis, Minn., assignor to General Mills, Inc., a corporation of Delaware Application December 11, 1948, Serial No. 64,841

13 Claims. (Cl. 219—19)

This application relates generally to automatic cookers of the waffle iron type in which the batter or material to be cooked is placed in contact with a heated cooking surface such as a mold or grid. More particularly, the invention relates to the combination of an improved timing device with such a member.

Various automatic timing devices have been proposed for use in combination with a waffle iron or grid type cooker. Most of these devices require the use of a bimetallic thermostatic member. On the other hand, a timer has been proposed for use in a cooker of the toaster type, in which the timer includes a member of so-called "thermomagnetic" material. So far as I am aware, however, no one has successfully made use of such thermomagnetic material in timing the operation of a waffle iron or cooking mold of the contact type. By "thermomagnetic material" is understood a metal which under normal temperature conditions has a relatively high magnetic permeability, but which at a certain critical temperature exhibits a sharp decrease in magnetic permeability. Such materials or alloys are well known in themselves.

It is accordingly one object of the present invention to provide an improved cooker of the waffle iron type.

It is another object to provide such a cooker in combination with an automatic timer embodying a member of thermomagnetic material.

A further object is the provision of an improved thermomagnetic timing device for use with a heated cooking mold.

Still another object is the provision of a timer in which a plurality of thermomagnetic members of different characteristics are utilized.

A still further object is the provision of a timer in which a plate of thermomagnetic material is in direct contact with one surface of a cooking mold, the material to be cooked being in direct contact with an opposite face of the mold.

Another object is the provision of an improved thermomagnetic timer in which the parts are mounted so as to provide a definite impact for actuation of a control switch.

Other objects and advantages of the invention will be apparent from the following description in which certain preferred embodiments of the invention are disclosed.

In the drawings which form a part of this application, and in which like reference characters indicate like parts, Figure 1 is a perspective view of a waffle iron embodying details of the invention.

In general I accomplish the objects of the present invention by the use of a thermomagnetic member mounted in good heat conductive relation with one face of the cooking mold. Preferably, the parts are held in direct contact with each other by suitable resilient means. The opposite surface of the mold member is in direct contact with the batter or material to be cooked and the temperature of the thermomagnetic member accordingly corresponds very accurately to the temperature of the surface of the cooked article.

It has been found that the surface temperature of a waffle or similar article reflects accurately the extent to which the cooking operation has been completed. According to the present invention, I have been able to utilize the temperature of a thermomagnetic member mounted in the above manner to control the operation of a suitable control switch to terminate the cooking operation after the desired surface temperature of the article has been reached.

The switch construction includes a permanent magnet which is mounted with respect to the thermomagnetic member so that these parts are capable of movement between a relatively separated position and a relatively close or adjacent position. Under normal conditions of permeability of the thermomagnetic member, the parts are in their adjacent positions and the switch is closed. When the thermomagnetic member reaches its critical temperature and thus undergoes a substantial loss in permeability, the magnet may be moved to a relatively separated position either under the influence of gravity or by a suitable spring or other tension device. This relative movement is utilized to open a control switch and thereby terminate the cooking operation. The mechanism is so designed that a substantial part of the relative movement may take place before the switch is actuated in order that the parts may build up sufficient momentum to obtain instantaneous and positive operation of the switch.

A novel construction has also been incorporated to obtain variations in the time of cooking. For this purpose several sections of thermomagnetic material are utilized, each section being of slightly different composition so that its loss of permeability will take place at a critical temperature different from that of the other sections. The sections are so mounted that any one desired section may be selectively moved into operative position with respect to the cooking member and the magnet. Thus the cooking operation may be terminated at different surface temperatures of the material or at the end of different time intervals.

Figure 1:
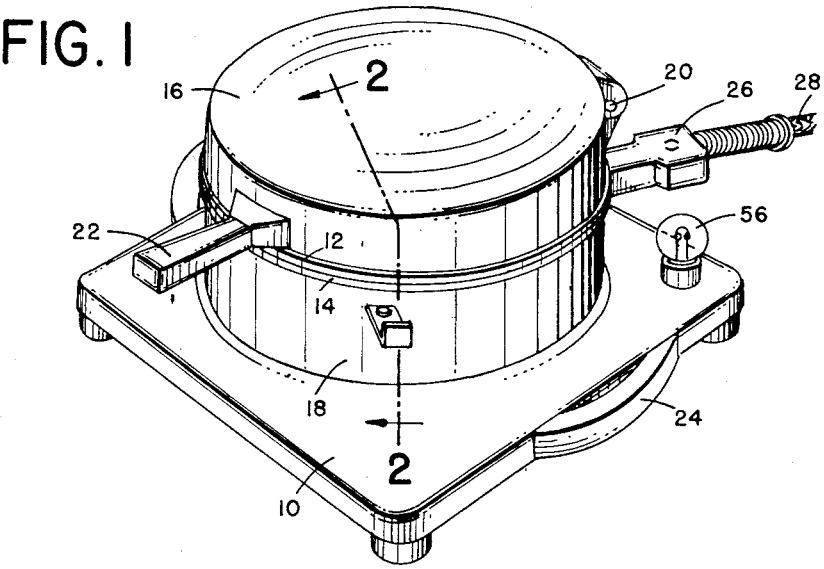

In Fig. 1 I have shown a perspective view of a waffle iron in which the present invention has been incorporated. This waffle iron includes a suitable base or supporting plate 10 on which upper and lower molds 12 and 14 are suitably mounted. Mold 14 is stationary with respect to base 10, whereas mold 12 is movably mounted so that the molds can be separated. A cover 16 encloses the outer portions of the upper mold 12 while a cylindrical shell 18 encloses the working parts of the mechanism and the lower mold 14. Cover 16 is pivoted at 20 to supports on the base so that the necessary relative movement of molds 12 and 14 may be obtained by tilting the cover upwardly. A handle 22 on cover 16 is used for this purpose.

Carrying handles 24 may be provided on base 10. The shell or housing 18 is further provided with a suitable socket for reception of an appliance plug 26 by means of which the device is connected to a suitable source of current through electric supply cord 28.

Figure 6:
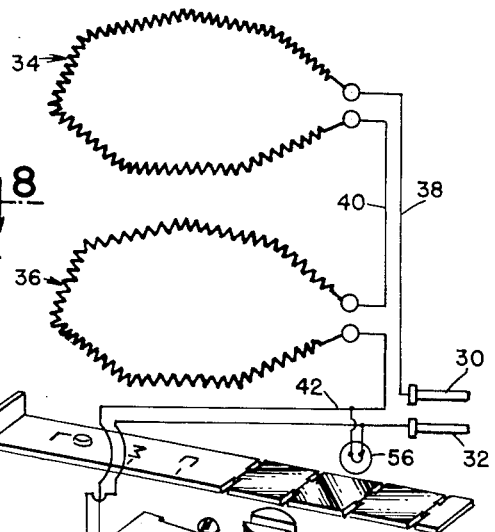
Fig. 6 is a schematic view showing the circuit connections according to the invention.

With reference to Fig. 6, the wiring diagram and arrangement of the parts are as follows. The plug 26 may be removably engaged with terminals 30 and 32 in the body of the waffle iron. Terminal 30 is connected directly by a wire 38 to one end of the heating element 34 of the upper grid 12. Wire 40 in turn connects the other end of upper heating element 34 to one end of the lower heating element 36 for grid 14. The other end of element 36 is connected by wire 42 to one blade 44 of a control switch 46. A contact 48 on blade 44 normally engages a similar contact 50 on the other switch blade 52. Blade 52 in turn is connected by wire 54 to the other supply terminal 32. A suitable signal light 56 is connected across wires 42 and 54 in order to give a visual indication whenever the switch is open. The switch, when closed, will effectively bypass or shunt light 56, so that the light will be off when heating elements 34 and 36 are energized.

Figure 3:
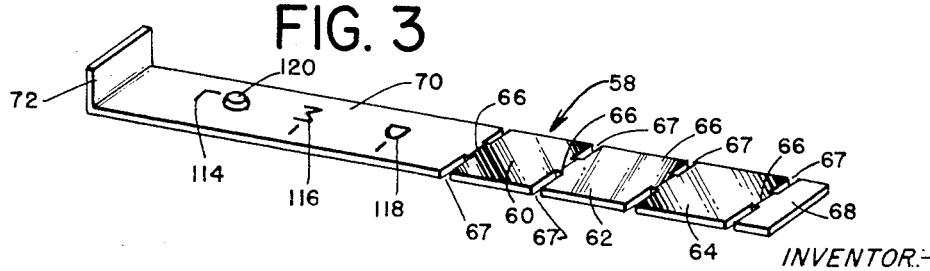
Fig. 3 is a perspective view of an improved thermomagnetic unit according to the invention.

One form of thermomagnetic member for use in operation of switch 46 is shown in perspective in Fig. 3. This thermomagnetic member, designated generally as 58, includes a plurality of plates 60, 62, and 64, each of which is made of thermomagnetic material of a composition slightly different from that of the other plates. Thus, for example, all of the plates may be of a nickel steel alloy with plate 60 having a nickel content of roughly 32.5%, with a nickel content of 34% for plate 62, and a nickel content of 36% for plate 64. Each of these plates will accordingly suffer a substantial loss in magnetic permeability at its critical temperature, the critical temperature of plate 60 being somewhat less than that of plate 62 while the critical temperature of plate 64 is slightly greater than that of plate 62. Plates 60, 62, and 64 are united to each other and to extensions 68 and 70 of non-thermomagnetic material by suitable joints 66 such as, for example, by silver soldering. Notches 67 are provided at the edges of these joints and extend inwardly between the respective plates in order to minimize the actual area of the soldered connection and thus cut down the transmission of heat from one plate to the other.

Extensions 68 and 70 increase the effective length of the thermomagnetic member 58 for cooperation with suitable guides by which the member is to be supported. Extension 70 may include a manipulating portion 72 at its outer end for operation by the user.

Figure 5:
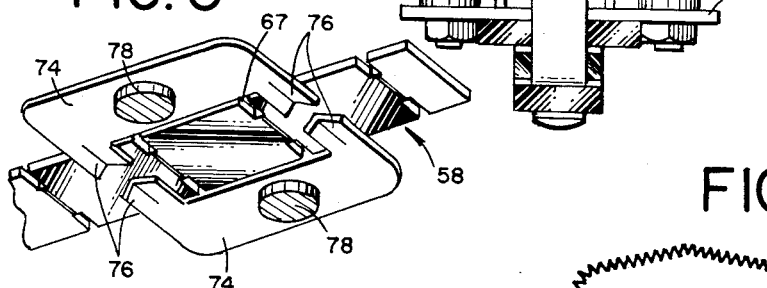
Fig. 5 is a partial perspective showing details of the mounting and support member for the thermomagnetic timing unit.

As shown in Fig. 5, the member 58 is supported from below by a pair of plates 74. Each of these supporting plates has a pair of angular projections 76 which engage the lower surface of thermomagnetic member 58. The angular faces of these projections 76 permit the longitudinal movement of member 58 without interlocking engagement with the notches 67 in the edges of the member. Projections 76 are sufficiently resilient to hold the thermomagnetic member firmly against the lower face of the grid.

Figure 4:
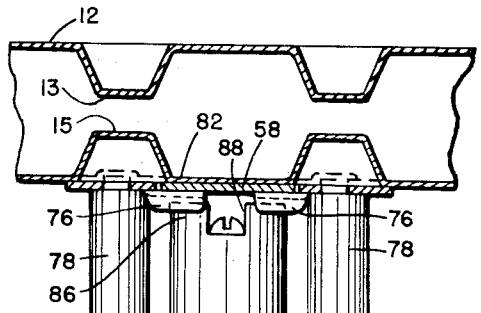
Fig. 4 is a partial sectional view on the line 4—4 of Fig. 2.

Plates 74 in turn are supported by posts 78 which are mounted on a frame member 80 which also serves as a support for the switch. It will be noted from Fig. 4 that the upper and lower molds or grids 12 and 14 are provided with inwardly offset portions 13 and 15 respectively, adapted to form depressions in the surface of the finished article such as a waffle. These portions 13 and 15 are arranged in any desired pattern. The lower grid, for example, is thus broken up by these patterned projections.

Thermomagnetic member 58 and supporting plates 74 are so located that member 58 will lie immediately adjacent and preferably in direct heat conductive contact with an area 82 of the lower grid which is not deformed.

As a result of this juxtaposition of member 58 and the lower surface of mold portion 82, the thermomagnetic member will reflect accurately the temperature conditions of the mold itself. Furthermore, since the upper surface of portion 82 of the mold is in direct contact with the batter or material to be cooked, the portion 82 will in turn accurately reflect the surface temperature of the batter. Thus the temperature of the thermomagnetic member 58 will be closely interrelated with the actual surface temperature of the batter and can thus be utilized to determine the length of the cooking period.

To cooperate with the member 58 of thermomagnetic material and achieve operation of the switch 46, a small permanent magnet 84 is provided. The use of a magnet made of an aluminum nickel alloy is preferred, since such magnets are not adversely affected by the heat from the cooking operation in the present application. Here, the magnet is so mounted that it is not subjected to direct temperature of the heating element. Such magnets are well known, and may be obtained currently under the trade name "Alnico." The magnet 84 and plate 58 are mounted for relative movement between a relatively adjacent position and a relatively separated position. In the present case this is accomplished by mounting magnet 84 on a horizontal supporting arm 92. One end of arm 92 is provided with a pair of downwardly directed flanges 94, each of which is provided with a circular opening 96. These openings are engaged by a supporting pin 98 carried by brackets 100 on frame member 80. Thus arm 92 is pivotally mounted with respect to frame member 80, and also with respect to thermomagnetic member 58.

The other end of supporting arm 92 carries an extension 102 on which a suitable insulating block or member 104 is mounted. A rod 106 mounted on the insulating block 104 engages a vertical slot 108 in the upwardly extending arm 110 of lower switch blade 52. Switch blades 52 and 44 are likewise mounted on supporting frame member 80 by insulating plates 112 which separate the switch blades electrically from each other and from the frame.

An adjusting screw 113 is mounted on horizontal arm 92 between magnet 84 and pivot 98. This adjusting screw, by engagement with supporting plate 80, limits the downward movement of magnet supporting arm 92 and thus determines the maximum air gap between the poles 86 and 88 of magnet 84 and the plate 60 of thermomagnetic material. This maximum air gap must be small enough so that magnet 84 and arm 92 will again be lifted by magnetic attraction when member 58 cools and regains its normal permeability.

The use of slot 108 in the switch arm 110 permits the magnet 84 and arm 92 to drop a given distance after the magnet has been released, before extension 110 is engaged to depress contact 50 and open the switch. Thus the parts, which drop under the influence of gravity, gain sufficient momentum for positive and instantaneous opening of the switch contacts.

With the foregoing description of the structural features of this embodiment in mind, the operation of the device will now be clear. When the device is to be used for baking waffles, the parts will initially be cold or at room temperature. Thermomagnetic member 58 will be adjusted in position by operation of finger piece 72 until the desired index mark 114, 116, or 118 is in position at the outer edge of casing 18. These marks correspond to the individual thermomagnetic plates 60, 62, and 64 so that a short, medium, or long time of cooking can be obtained by the use of a plate having a relatively lower, medium, or higher critical temperature. One or more stops 120 on the extension 70 may cooperate with housing 18 to assist in location of the member 58. After adjustment of the member 58 so that the desired plate 60, 62, or 64 is in position against the lower surface of grid portion 82 and between that portion and the poles of magnet 84, the user will connect the electrical supply cord 28 so that current will be brought to the terminals 30 and 32.

Figure 2:
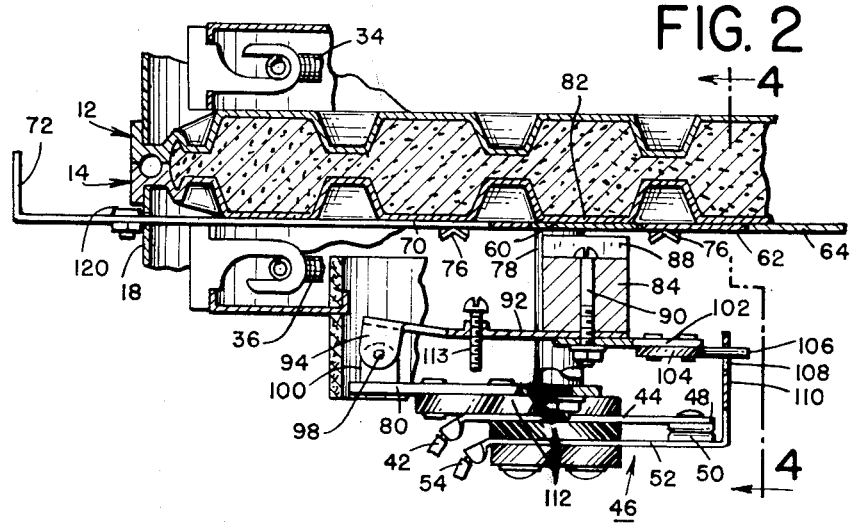
Fig. 2 is a partial sectional view of the line 2—2 of Fig. 1, with certain portions broken away for clearness.

If member 58 is set for the production of light waffles as in Fig. 2, plate 60 will be in position against grid portion 82. Since plate 60 is at a relatively low temperature, it will have a high magnetic permeability. Magnet 84 will accordingly be attracted to plate 60 and this attraction will be sufficient to overcome the downward influence of gravity on the members. Magnet 84 and supporting arm 92 will accordingly be in the raised position of Fig. 2, in which further upward movement is limited by engagement of pin 108 with the upper end of slot 108. Either a positive stop may be provided to assist in establishing this upper limit, or switch arm 44 may be made sufficiently rigid to resist further upward movement of switch arm 52 or extension 110.

In this raised or relatively close position, the upper faces of poles 86 and 88 of magnet 84 lie closely adjacent but preferably not in direct contact with plate 60. A slight air gap is preferred in this position in order that the magnetic attraction will be strong but at the same time heat will not be conducted directly from the plate 60 to the magnet itself.

Since contacts 48 and 50 are in engagement in this position of the parts, the circuit will be completed so that electrical heating elements 34 and 36 for the respective grids will be energized. At the same time the signal light 56 will be shunted by wires 42 and 54 and switch 46 so that there will be no visible signal. As soon as the grids are sufficiently hot, the plate 60 of member 58 will reach its critical temperature and the permeability of plate 60 will suddenly decrease. The forces of magnetic attraction will therefore be reduced sufficiently so that the magnet drops under the influence of gravity. Downward movement of the magnet and its supporting arm will open switch 46 in the manner described to break the circuit and thus substantially deenergize the heating elements. The light and its resistance will now be in circuit with the heating elements, so that the light will come on, while at the same time the energization of elements 34 and 36 is substantially decreased. The light gives a visual signal that the device is hot enough for the cooking operation.

At this point the housewife may open the waffle iron and place the desired amount of batter on the lower grid 14. The cover 16 and upper grid 12 are then moved to the closed position for the cooking operation.

The introduction of the cold batter will immediately cool the lower grid and particularly the area 82 adjacent thermomagnetic plate 60. The plate in turn will be cooled promptly due to the good heat conductivity between the parts and the absence of any substantial heat storage capacity in these elements. As soon as plate 60 cools below its critical temperature, its permeability is substantially restored and magnet 84 will again be attracted so that switch 46 will be closed and the heating elements reenergized for the cooking operation. The light will accordingly go off to signify the start of the actual cooking cycle.

This cooking cycle will continue until the temperature of the batter at its surface, i. e., adjacent grid area 82, becomes sufficiently high so that plate 60 of thermomagnetic member 58 reaches its critical temperature and the magnet is again permitted to drop. This subsequent dropping movement will open the switch, turn on the light, and substantially deenergize the heating elements. The change in condition of the light will signify to the operator that the cooking cycle is finished. In this case, the presence of the hot waffle within the molds 12 and 14 will tend to resist rapid cooling of the parts so that the switch will remain in the open position until the user has had time to open the cover of the waffle iron and remove the waffle.

The above cooking cycle can be repeated as desired, and the adjustment of member 58 may be changed to alter the color of the finished product.

Figure 7:
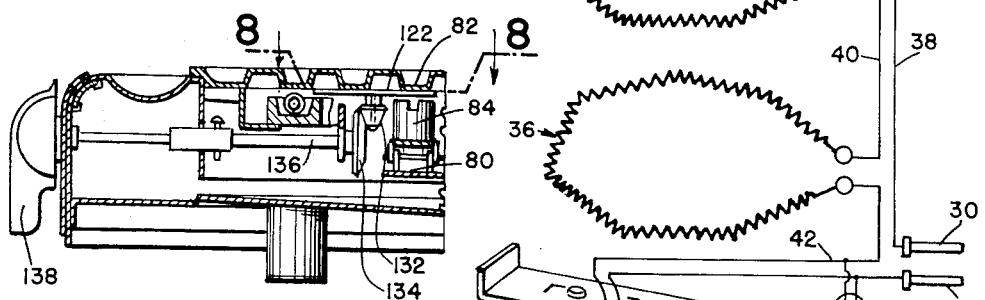
Fig. 7 is a partial sectional view of another embodiment of the invention.
Figure 8:
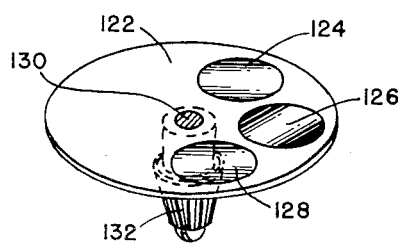
Fig. 8 is a perspective view of a modified thermomagnetic timing unit as used in the device of Fig. 7.

In Figs. 7 and 8 an alternate embodiment of the invention is described in which the thermomagnetic member is in the form of a disk 122.

This disk is provided with inserts 124, 126, and 128 of thermomagnetic material of different characteristics just as in the case of plates 60, 62, and 64 respectively of the embodiment of Fig. 3. Disk 122 is supported on a vertical shaft 130 which is rotatably mounted in any desired manner in the waffle iron housing. A bevel gear 132 at the lower end of shaft 130 is engaged by a bevel gear 134 on a horizontal shaft 136. Shaft 136 in turn projects beyond the casing of the waffle iron and is provided with an external knob 138 for manipulation by the user. Thus rotation of knob 138 will adjust the position of member 122 through the gears 134 and 132 so that the desired plate portion 124, 126, or 128 may be selectively engaged with the area 82 of the lower grid just above magnet 84. Resilient supports may be provided as in the previous case to increase the effective heat conductive contact between the desired plate portion and grid area 82. Magnet 84 and its associated switch parts are the same in this embodiment as in the previous case. Thus another structure has been provided in which the advantages of the thermomagnetic timer of the present application in combination with the cooking surface of a waffle iron or similar cooker can be obtained, with a relatively simple adjustment for changing the time and final temperature of the cooking operation.

An important advantage of the present construction is the close heat conductive relationship between the cooking surface 82 and the magnetic member 58 or 122. No matter what portion of the switch cycle the parts may be in when the housewife desires to use the device, the introduction of the cold batter on lower grid 14 will cool the thermomagnetic member promptly to close the switch and start the cycle.

Thus whether the switch be open or closed at the instant the batter is introduced, the cooking cycle will be started without substantial delay. In the event that the grid has not cooled sufficiently after the waffle has been removed from a previous cooking cycle, the introduction of the batter for the next cooking operation will produce the necessary cooling effect to reinitiate the cycle. Furthermore, whether batter is introduced or not, the thermomagnetic member will function continuously to hold the grids substantially at the baking temperature while idling, i. e., between periods of actual cooking. In other words, even without the introduction of cold batter, the mold and thermomagnetic member would ultimately cool sufficiently to reclose the switch and repeat the cycle. It is my belief that the thermomagnetic switch, during such cycling, holds the grids at a more uniform temperature than one can obtain with a switch of the thermostatic type which is currently used for such cooking devices.

A timing device has accordingly been developed in which there is no critical point at which the batter must be introduced for a particular cooking operation. The use of the batter itself to cooperate directly with the switch and condition it for the next cooking cycle thus simplifies greatly the operation of the device from a technical standpoint and eliminates the need for detailed working instructions which are often ignored by the user, with adverse effect on the finished product. With the present combination of cooker and timer, uniform results may be obtained regardless of variations in operation among different users and regardless of differences in the manner in which any one user operates the device.

The provision of a plurality of thermomagnetic portions of different characteristics and the mounting of such portions so that any one of them may be used selectively in cooperation with a portion of the cooking mold and the magnetic part of the switch makes it possible to vary the cooking results in a desired manner without the use of complicated mechanical features.

Changes and modifications may be made in the specific structure and arrangement of the parts, in the light of the teachings of this application. The present invention is accordingly intended to include all such modifications and improvements as fall within the spirit and scope of the attached claims.

Now, therefore, I claim:

1. An electric timing device for use with a heated cooking member having a heating circuit to be controlled, comprising a plate of thermomagnetic material, means for supporting the plate in heat conductive relation with the cooking member, a magnet, means supporting the magnet and the plate for relative movement toward and away from each other in response to changes in permeability of the plate, a control member operatively associated with the last mentioned supporting means and connected to the heating circuit to control the heated member in response to such relative movement, the plate having a plurality of portions of different composition and different thermomagnetic characteristics, and being movably mounted for selective location of each portion in operative position with respect to both the heated member and the magnet, and manually operable control means connected to said plate for moving it to the desired selective location.

2. An electric timing device for use with a heated cooking member having a heating circuit to be controlled, comprising a plate of thermomagnetic material, means supporting the plate with one face in direct heat conductive engagement with the member, a magnet, means supporting the magnet with its poles adjacent the opposite face of the plate for relative movement toward and away from the plate in response to changes in permeability of the plate, an electric switch operatively associated with the last mentioned supporting means and connected to the heating circuit to control the heated member in response to such relative movement, the plate having a plurality of portions of different thermomagnetic characteristics and being movably mounted for selective location of each portion in operative position with respect to both the heated member and the magnet, and manually operable control means connected to said plate for moving it to the desired selective location.

3. In a cooking device comprising a cooking member having an area for direct engagement with a material to be cooked, and means for heating the member, the improvement comprising a plate of thermomagnetic material, means mounting the plate with one face in direct heat-conductive relation to the cooking member at said area, said plate being spaced from the heating means and therefore primarily responsive only to the temperature of the cooking member and any material thereon rather than to the heating means, a magnet, means supporting the magnet with its pole-pieces adjacent the plate for relative movement from a first relatively close position to a second relatively separated position with respect to the plate in response to changes in permeability of the plate corresponding to changes in temperature of the material to be cooked, and a control member operatively connected to the heating means and operatively associated with the supporting means, magnet and plate, said control member energizing the heating means when the parts are in the first position and deenergizing the heating means and terminating the cooking operation when the parts move to the second position.

4. In a cooking device comprising a cooking member having a relatively thin portion with one surface for direct engagement with the material to be cooked, and an electrical heating element for the member, the improvement comprising a plate of thermomagnetic material, means mounting the plate with one face in direct heat conductive relation to the surface of said thin portion, said plate being spaced from the heating means and therefore primarily responsive only to the temperature of the cooking member and any material thereon rather than to the heating means, a magnet, means supporting the magnet and plate for movement from a first relatively close position to a second relatively separated position with respect to the plate in response to changes in permeability of the plate corresponding to changes in temperature of the material to be cooked, and a control switch connected in circuit with the heating element and operatively associated with the supporting means, magnet and plate, said control switch energizing the element when the parts are in the first position and deenergizing the element and terminating the cooking operation when the parts move to the second position.

5. A cooking device having a relatively thin grid, one surface of which is adapted for direct contact with the surface of the material to be cooked, heating means for the grid, said grid having a control area on its opposite surface out of direct engagement with the heating means and a thermomagnetic timer for controlling the energization of the heating means, said timer including a plate of thermomagnetic material supported in direct heat conducting engagement against the control area of said opposite surface of the grid and thereby directly responsive to the temperature of the grid and material and only indirectly to the temperature of the heating means, said thermomagnetic member controlling the operation of the timer to deenergize the heating means and terminate the cooking operation in response to change in permeability of the member when the surface of the material to be cooked reaches a predetermined temperature.

6. A cooking device having a relatively thin grid, one surface of which is adapted for direct contact with the surface of the material to be cooked, heating means for the grid, and a thermomagnetic timer for controlling the energization of the heating means, said timer including a plate of thermomagnetic material supported in direct heat conducting engagement against the opposite surface of the grid and thereby directly responsive to the temperature of the grid and material, said thermomagnetic member controlling the operation of the timer to deenergize the heating means when the surface of the material to be cooked reaches a predetermined temperature, the timer including a plurality of thermomagnetic portions of different composition, and readily movable manually operable means for selective engagement of any desired portion with the grid to vary the surface temperature and consequently the degree of cooking of the particular material.

7. A cooking device according to claim 6 in which the different portions of thermomagnetic material are mounted in alignment on a longitudinal member, and said member is supported for longitudinal sliding movement for selective engagement of the desired portion with the grid, said member having means reducing the conduction of heat longitudinally from one of said portions to another.

8. A cooking device according to claim 6 in which the portions of different thermomagnetic material are located circumferentially on a rotatable plate at equal radii from the center of rotation of the plate, the device including readily movable manual operating means for rotation of the plate and engagement of a selected portion with the grid.

9. In a cooking appliance having a heated cooking member for direct engagement with material to be cooked and an electric heating circuit for the member, the improvement comprising a base member below the cooking member, supporting means extending upwardly from the base, a plate of thermomagnetic material mounted on the supporting means in spaced relation above the base, resilient means urging the plate upwardly in direct heat conducting engagement with the cooking member, a horizontal control arm member between the base and thermomagnetic plate, one end of the control arm being pivotally mounted on the base for rotation on a horizontal axis, a permanent magnet mounted on the control arm spaced from said axis, the magnet having pole pieces extending upwardly toward the thermomagnetic plate, the magnet and control arm being movable from a first position in which the magnet is held by its own attraction relatively close to the plate to a second position in which the magnet drops away from the plate in response to decrease in permeability of the plate at a predetermined temperature of the cooking member, a switch also mounted on the base, and connected to the heating circuit, and connecting means on the control arm and switch controlling the operation of the switch and heating circuit in accordance with the relative movement of the control arm and magnet toward and away from the plate, said connecting means opening the switch and terminating the cooking operation in response to movement of the magnet and control arm to second position.

10. In a cooking appliance having a heated relatively thin cooking member for direct engagement with material to be cooked and an electric heating circuit for the member, the improvement comprising a base member below the cooking member, supporting means extending upwardly from the base, a plate of thermomagnetic material mounted on the supporting means in spaced relation above the base and parallel thereto, means holding the plate in direct heat conducting engagement with the undersurface of the cooking member, a horizontal control arm member between the base and thermomagnetic plate, one end of the control arm being pivotally mounted on the base for rotation on a horizontal axis, a permanent magnet mounted on the control arm spaced from said axis, the magnet having pole pieces extending upwardly toward the thermomagnetic plate, the magnet and control arm being movable from a first position in which the magnet is held by its own attraction relatively close to the plate to a second position in which the magnet drops away from the plate in response to decrease in permeability of the plate at a predetermined temperature of the cooking member, a switch also mounted on the base, and connected to the heating circuit, and connecting means on the control arm and switch controlling the operation of the switch and heating circuit in accordance with the relative movement of the control arm and magnet toward and away from the plate, said connecting means opening the switch and terminating the cooking operation in response to movement of the magnet and control arm to second position.

11. In a cooking appliance having a heated cooking member and an electric heating circuit for the member, the improvement comprising a base member below the cooking member, supporting means extending upwardly from the base, a plate of thermomagnetic material mounted on the supporting means in spaced relation above the base, in direct engagement with the cooking member, a horizontal control arm member between the base and thermomagnetic plate, one end of the control arm being pivotally mounted on the base for rotation on a horizontal axis, a permanent magnet mounted on the control arm spaced from said axis, the magnet having pole pieces extending upwardly toward the thermomagnetic plate, a switch also mounted on the base, and connected to the heating circuit, and connecting means on the control arm and switch controlling the operation of the switch and heating circuit in accordance with the relative movement of the control arm and magnet toward and away from the plate, said thermomagnetic plate including a plurality of portions of different composition and different thermomagnetic characteristics, the plate being movable on its supporting means for selective location of the different portions above the magnet and in direct engagement with the undersurface of the cooking member, and a manual control means connected to the plate for moving said portions to the desired selective locations.

12. A cooking appliance according to claim 9 in which one of said control arms and base members is provided with adjustable stop means engaging the other of said members and limiting downward movement of the control arm member away from the plate.

13. A cooking appliance according to claim 9 in which the connecting means on the control arm and switch includes lost-motion means providing for limited initial downward movement of the magnet and control arm before said arm moves the switch.

MAURICE H. GRAHAM.

References Cited in the file of this patent

UNITED STATES PATENTS

| Number | Name | Date |
| --- | --- | --- |
| 1,617,360 | Woodson | Feb. 15, 1927 |
| 1,655,852 | Adams | Jan. 10, 1928 |
| 1,675,680 | White | July 3, 1928 |
| 1,870,176 | Hodgkins | Aug. 2, 1932 |
| 1,871,262 | Ellingson | Aug. 9, 1932 |
| 1,985,033 | Hudson | Dec. 18, 1934 |
| 2,070,482 | Hawkins | Feb. 9, 1937 |
| 2,207,871 | Myers | July 16, 1940 |
| 2,214,928 | Klapperich | Sept. 17, 1940 |
| 2,267,387 | Winborne | Dec. 23, 1941 |
| 2,269,162 | Newell | Jan. 6, 1942 |
| 2,437,488 | Ulanet | Mar. 9, 1948 |